United States Patent
Farkas et al.

(10) Patent No.: US 12,162,974 B2
(45) Date of Patent: Dec. 10, 2024

(54) THERMOPLASTIC POLYURETHANES WITH HIGH MOISTURE VAPOR TRANSMISSION AND LOW WATER ABSORPTION

(71) Applicant: Lubrizol Advanced Materials, Inc., Cleveland, OH (US)

(72) Inventors: Julius Farkas, North Ridgeville, OH (US); Charles P. Jacobs, Elyria, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 18/381,717

(22) Filed: Oct. 19, 2023

(65) Prior Publication Data
US 2024/0043603 A1 Feb. 8, 2024

Related U.S. Application Data

(62) Division of application No. 16/769,665, filed as application No. PCT/US2018/059544 on Nov. 7, 2018, now Pat. No. 11,827,737.

(60) Provisional application No. 62/595,630, filed on Dec. 7, 2017.

(51) Int. Cl.
| | | |
|---|---|---|
| C08G 18/42 | (2006.01) | |
| C08G 18/10 | (2006.01) | |
| C08G 18/76 | (2006.01) | |
| C08G 63/20 | (2006.01) | |
| D01D 5/00 | (2006.01) | |
| D01F 6/70 | (2006.01) | |

(52) U.S. Cl.
CPC ......... *C08G 18/4238* (2013.01); *C08G 18/10* (2013.01); *C08G 18/4252* (2013.01); *C08G 18/7671* (2013.01); *C08G 63/20* (2013.01); *D01D 5/00* (2013.01); *D01F 6/70* (2013.01)

(58) Field of Classification Search
CPC .............. C08G 18/4252; C08G 18/425; C08G 18/4238; D01D 5/00; D01F 6/70
See application file for complete search history.

(56) References Cited

U.S. PATENT DOCUMENTS

| | | | | |
|---|---|---|---|---|
| 3,009,765 | A * | 11/1961 | Slovin | C08G 18/10 264/238 |
| 3,679,633 | A * | 7/1972 | Matsubayashi et al. | C08G 18/10 264/210.8 |
| 5,053,464 | A * | 10/1991 | Shirai | C08G 18/3897 540/129 |
| 5,712,320 | A * | 1/1998 | Green | C08G 18/4238 521/173 |
| 7,202,322 | B2 * | 4/2007 | Vedula | C08G 18/6674 428/221 |
| 2006/0020100 | A1 * | 1/2006 | Lee | C08G 18/425 528/44 |
| 2007/0049684 | A1 * | 3/2007 | Rische | C08G 18/0866 428/423.1 |
| 2009/0149622 | A1 * | 6/2009 | Sonnenschein | C08G 18/10 528/65 |
| 2009/0221784 | A1 * | 9/2009 | Guelcher | C08G 18/10 528/48 |
| 2019/0017194 | A1 * | 1/2019 | Rhee | D01D 5/00 |

FOREIGN PATENT DOCUMENTS

| | | | | |
|---|---|---|---|---|
| JP | 2011168690 | A * | 9/2011 | |
| WO | WO-2007123536 | A1 * | 11/2007 | A61L 27/18 |
| WO | WO-2017040505 | A1 * | 3/2017 | |

\* cited by examiner

*Primary Examiner* — Michael M Dollinger
(74) *Attorney, Agent, or Firm* — Eryn Ace Fuhrer; Michael A. Miller

(57) ABSTRACT

A novel thermoplastic polyurethane composition is disclosed which comprise the reaction product of a polyisocyanate component, a polyol component, wherein the polyol component comprises a polyester comprising the reaction product of triethylene glycol and/or tetraethylene glycol with a diacid having 6 carbon atoms or fewer, and, optionally, a chain extender component.

18 Claims, No Drawings

THERMOPLASTIC POLYURETHANES WITH HIGH MOISTURE VAPOR TRANSMISSION AND LOW WATER ABSORPTION

CROSS REFERENCE TO RELATED APPLICATION

This application is a Divisional of application Ser. No. 16/769,655 filed on Jun. 4, 2020 which claims priority from PCT Application Serial No. PCT/US2018/059544 filed on Nov. 7, 2018, which claims the benefit of U.S. Provisional Application No. 62/595,630 filed on Dec. 7, 2017, the entirety of all of which is hereby incorporated by reference.

TECHNICAL FIELD

The present invention relates to a thermoplastic polyurethane composition that has a surprisingly high moisture vapor transmission and low water absorption.

BACKGROUND OF THE INVENTION

The moisture vapor transmission (MVT) properties of a thermoplastic polyurethane (TPU) composition can be important in a variety of applications such as fabric coating, apparel, roofing membranes, house wraps, furniture, mattress covers among others. A high MVT TPU will allow moisture vapor to escape but will not allow liquid water to penetrate. This feature may provide benefits such as allowing clothing to be more comfortable or keeping building structures dry. A TPU having the properties of high MVT and low water absorption is highly desirable and would allow enhanced performance in a variety of products.

SUMMARY OF THE INVENTION

The present invention is directed to a thermoplastic polyurethane composition comprising in reacted form a polyisocyanate component, and a polyester polyol component, comprising the reaction product of triethylene glycol and/or tetraethylene glycol with a diacid having 6 carbon atoms or fewer. The reaction mixture may optionally comprise a chain extender component.

In one embodiment, the diacid having 6 carbon atoms or fewer comprises adipic acid, succinic acid, or mixtures thereof. The polyester may comprise or consist of triethylene glycol adipate, tetraethylene glycol adipate, triethylene glycol succinate, tetraethylene glycol succinate, or combinations thereof.

In another embodiment, the polyol component of the thermoplastic polyurethane composition of the invention may comprise, in one embodiment, a polyester which is the reaction product of triethylene glycol, ethoxylated polyether 1,3-diol, and a diacid having 6 carbon atoms or fewer.

In one embodiment, the invention comprises an article made from the thermoplastic polyurethane as described herein. The article may be a fiber, fabric, or molded article. In one embodiment, the invention comprises an article made from the thermoplastic polyurethane described herein wherein the thermoplastic polyurethane as has a Shore A hardness of 70A to 95A. In another embodiment, the invention comprises an article made from the thermoplastic polyurethane composition described herein, wherein the thermoplastic polyurethane composition has a moisture vapor transmission of at least 1700 g/m$^2$ 24 hr measured by a Mocon Permatran-W per ASTM D6701. In another, embodiment, the invention comprises an article made from the thermoplastic polyurethane composition described herein, wherein the thermoplastic polyurethane composition has a water absorption measured by ASTM D471 of 30% or less and a hardness of 85 Shore A or less measured by ASTM D2240. In still another embodiment, the invention comprises an article made from the thermoplastic polyurethane composition described herein, wherein the thermoplastic polyurethane composition has a water absorption measured by ASTM D471 of 15% or less and a hardness of 85 Shore A or greater.

The present invention further comprises a method of increasing the moisture vapor transmission while decreasing the water absorption of a thermoplastic polyurethane composition. The method comprises preparing a thermoplastic polyurethane composition as described herein by reacting a polyisocyanate component with a polyester polyol component which comprises the reaction product of triethylene glycol and/or tetraethylene glycol with a diacid having 6 carbon atoms or fewer, and optionally, a chain extender component. The present invention also comprises a method of increasing the moisture vapor transmission of a fabric while decreasing the water absorption of the fabric, comprising preparing a thermoplastic polyurethane composition by reacting a polyisocyanate component with a polyester polyol component comprising the reaction product of triethylene glycol and/or tetraethylene glycol with a diacid having 6 carbon atoms or fewer, and optionally, a chain extender component, spinning the thermoplastic polyurethane composition to form a fiber; and using the fiber to make a fabric.

Additional details of the invention and other embodiments are described herein in the following detailed description.

DETAILED DESCRIPTION OF THE INVENTION

The present invention comprises a thermoplastic polyurethane composition comprising the reaction product of a polyisocyanate component, a polyester polyol component, and, optionally, a chain extender component.

Polyisocyanate Component

Any polyisocyanates known to those skilled in the art may be used to make TPU compositions useful in the present invention. In some embodiments, the polyisocyanate component includes one or more diisocyanates, which may be selected from aromatic diisocyanates or aliphatic diisocyanates or combinations thereof. Examples of useful polyisocyanates include, but are not limited to aromatic diisocyanates such as 4,4'-methylenebis(phenyl isocyanate) (MDI), m-xylene diisocyanate (XDI), phenylene-1,4-diisocyanate, 3,3'-dimethyl-4,4'-biphenylene diisocyanate (TODI), 1,5-naphthalene diisocyanate (NDI), and toluene diisocyanate (TDI), as well as aliphatic diisocyanates such as isophorone diisocyanate (IPDI), 1,6-hexamethylene diisocyanate (HDI), 1,4-cyclohexyl diisocyanate (CHDI), decane-1,10-diisocyanate, lysine diisocyanate (LDI), 1,4-butane diisocyanate (BDI), pentamethylene diisocyanate (PDI), and dicyclohexylmethane-4,4'-diisocyanate (H12MDI). Mixtures of two or more polyisocyanates may be used.

Isocyanates used to make the TPU materials of the present invention will depend on the desired properties for the desired end use application.

In one embodiment of the invention, the polyisocyanate component comprises as 4,4'-methylenebis(phenyl isocyanate). In another embodiment, the polyisocyanate component consists of as 4,4'-methylenebis(phenyl isocyanate).

The Polyester Polyol Component

The polyol component of the present invention comprises a polyester polyol. Methods for preparing polyester polyols are generally known in the art and include esterification reaction of glycols with one or more dicarboxylic acids or anhydrides or transesterification reaction, i.e., the reaction of one or more glycols with esters of dicarboxylic acids. In making polyester polyols, mole ratios generally in excess of more than one mole of glycol to acid are used so as to obtain linear chains having a preponderance of terminal hydroxyl groups. The polyester polyol useful in the present invention comprises, as the glycol component, triethylene glycol, tetraethylene glycol, or mixtures thereof. In one embodiment, the glycol component may also include a minor amount of an ethoxylated polyether diol such as ethyoxylated polyether 1,3-diol, for example, a diol commercially available as Tegomer™ 3403. The diacid useful for preparing the polyester polyol for the present invention may be selected from those carboxylic diacids having 6 carbon atoms or fewer. In some embodiments, the diacid may comprise adipic acid, succinic acid, or mixtures thereof.

In one embodiment of the invention, the polyol component comprises or consists of triethylene glycol adipate. In another embodiment, the polyol component comprises or consists of tetraethylene glycol adipate. In still another embodiment, the polyol component comprises or consists of triethylene glycol succinate. In yet another embodiment, the polyol component comprises or consists of tetraethylene glycol succinate.

Polyester polyols useful in the present invention may have a number average molecular weight (Mn) of from about 500 to about 10,000, from about 700 to about 5,000, or from about 700 to about 4,000, and generally have an acid number less than 1.3 or even preferably less than 0.5. The molecular weight is determined by assay of the terminal functional groups and is related to the number average molecular weight.

In some embodiments of the present invention, the polyol component may further include a copolyol in addition to the polyester polyols described above. The copolyols may be selected from polyether polyols, polyester polyols other than triethylene glycol adipate, triethylene glycol succinate, tetraetheylene glycol adipate, tetraethylene glycol succinate, polycarbonate polyols, polysiloxane polyols, and combinations thereof. Additional polyol components should be understood to include those known in the art as well as any polyol intermediates hereafter developed. In one embodiment, where a copolyol is included, the polyol component contains 10% by weight or less of the copolyol.

Chain Extenders

The TPU compositions useful in the present invention may, optionally, be made using a chain extender component. Chain extenders include diols, diamines, and combinations thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-propanediol, 1,3-butanediol, 1,5-pentanediol, neopentylglycol, 1,4-cyclohexanedimethanol (CHDM), 2,2-bis[4-(2-hydroxyethoxy) phenyl]propane (HEPP), heptanediol, nonanediol, dodecanediol, 3-methyl-1,5-pentanediol, ethylenediamine, butanediamine, hexamethylenediamine, hydroquinone bis (2-hydroxyethyl) ether, and hydroxyethyl resorcinol (HER), and the like, as well as mixtures thereof. In some embodiments, the chain extender is present and comprises or consists of 1,4-butanediol. Other glycols, such as aromatic glycols could be used, but in some embodiments the TPUs described herein are essentially free of or even completely free of such materials.

To prepare TPU compositions useful in the present invention, the three reactants (the polyester polyol intermediate, the diisocyanate, and the optional chain extender) are reacted together, optionally in the presence of a catalyst. Any known or hereafter developed processes to react the three components may be used to make the TPU. In one embodiment, the process is a so-called "one-shot" process where all three reactants are added to an extruder reactor and reacted. The equivalent weight amount of the diisocyanate to the total equivalent weight amount of the hydroxyl containing components, that is, the polyol intermediate and the chain extender glycol, can be from about 0.95 to about 1.10, or from about 0.96 to about 1.03, and even from about 0.97 to about 1.05.

The TPU can also be prepared utilizing a pre-polymer process. In the prepolymer route, the polyol intermediates are reacted with generally an equivalent excess of one or more diisocyanates to form a pre-polymer solution having free or unreacted diisocyanate therein. The reaction may optionally be carried in the presence of a suitable urethane catalyst. Subsequently, a chain extender, as described above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about 0.95 to about 1.10, or from about 0.96 to about 1.03 and even from about 0.97 to about 1.05. Typically, the pre-polymer route can be carried out in any conventional device including an extruder as is known in the art. In such embodiments, the polyol intermediates may be reacted with an equivalent excess of a diisocyanate in a first portion of the extruder to form a pre-polymer solution and subsequently the chain extender is added at a downstream portion and reacted with the pre-polymer solution.

In one embodiment, the ingredients are mixed on a single or twin screw extruder with multiple heat zones and multiple feed ports between its feed end and its die end. The ingredients may be added at one or more of the feed ports and the resulting TPU composition that exits the die end of the extruder may be pelletized.

The preparation of the various polyurethanes in accordance with conventional procedures and methods and since as noted above, generally any type of polyurethane can be utilized, the various amounts of specific components thereof, the various reactant ratios, processing temperatures, catalysts in the amount thereof, polymerizing equipment such as the various types of extruders, and the like, are all generally conventional, and well as known to the art and to the literature.

The described process for preparing the TPU of the invention includes both the "pre-polymer" process and the "one shot" process, in either a batch or continuous manner. That is, in some embodiments the TPU may be made by reacting the components together in a "one shot" polymerization process wherein all of the components, including reactants are added together simultaneously or substantially simultaneously to a heated extruder and reacted to form the TPU. While in other embodiments the TPU may be made by first reacting the polyisocyanate component with some portion of the polyol component forming a pre-polymer, and then completing the reaction by reacting the pre-polymer with the remaining reactants, resulting in the TPU.

Optionally, it may be desirable to utilize catalysts such as stannous and other metal carboxylates as well as tertiary amines. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like, phenyl mercuric propionate, lead octoate, iron acetylacetonate, magnesium acetylacetonate, or bismuth compounds such as bismuth octoate, bismuth laurate, and the like.

Various types of optional components can be present during the polymerization reaction, and/or incorporated into the TPU elastomer described above to improve processing and other properties. These additives include but are not limited to antioxidants, such as phenolic types, organic phosphites, phosphines and phosphonites, hindered amines, organic amines, organo sulfur compounds, lactones and hydroxylamine compounds, biocides, fungicides, antimicrobial agents, compatibilizers, electro-dissipative or anti-static additives, fillers and reinforcing agents, such as titanium dioxide, alumina, clay and carbon black, flame retardants, such as phosphates, halogenated materials, and metal salts of alkyl benzenesulfonates, impact modifiers, such as methacrylatebutadiene-styrene ("MBS") and methylmethacrylate butylacrylate ("MBA"), mold release agents such as waxes, fats and oils, pigments and colorants, plasticizers, polymers, rheology modifiers such as monoamines, polyamide waxes, silicones, and polysiloxanes, slip additives, such as paraffinic waxes, hydrocarbon polyolefins and/or fluorinated polyolefins, radiopaque additives such as barium sulfate, nucleating agents, such as talc, and UV stabilizers, which may be of the hindered amine light stabilizers (HALS) and/or UV light absorber (UVA) types. Other additives may be used to enhance the performance of the TPU composition or blended product. All of the additives described above may be used in an effective amount customary for these substances.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

In one embodiment, the thermoplastic polyurethane composition as described herein has a Shore A hardness of 70A to 95A. In one embodiment, the thermoplastic polyurethane composition of the present invention which has a MVT of at least 1700 g/m² 24 hr measured by a Mocon Permatran-W per ASTM D6701, for example at least 2000 g/m²*24 hr, or even at least 2400 g/m²*24 hr. In one embodiment, the thermoplastic polyurethane composition as described herein has a water absorption measured by ASTM D471 of 30% or less and a hardness of 85 Shore A or less as measured by ASTM D2240. In another embodiment, the thermoplastic polyurethane composition as described herein has a water absorption measured by ASTM D471 of 15% or less and a hardness of 85 Shore A or greater.

The thermoplastic polyurethane compositions of the invention and any blends thereof may be formed into monolayer or multilayer films, including breathable films. These films may be formed by any of the conventional techniques known in the art including extrusion, co-extrusion, extrusion coating, lamination, blowing and casting or any combination thereof.

In another embodiment, a film layer comprising the compositions of this invention or any blends thereof may be combined with one or more other layers. The other layer(s) may be any layer typically included in multilayer film structures. For example, the other layer or layers may be: (i) Polyolefins: suitable polyolefins include homopolymers or copolymers of C2 to C40 olefins, preferably C2 to C20 olefins, preferably a copolymer of an α-olefin and another olefin or α-olefin (ethylene is defined to be an α-olefin for purposes of this invention). Suitable polyolefins also include homopolyethylene, homopolypropylene, propylene copolymerized with ethylene and or butene, ethylene copolymerized with one or more of propylene, butene or hexene, and optional dienes. Suitable examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics; (ii) Polar Polymers: suitable polar polymers include homopolymers and copolymers of esters, amides, acetates, anhydrides, copolymers of a C2 to C20 olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride; (iii) Cationic Polymers: suitable cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Suitable α-heteroatom olefins include vinyl ether and vinyl carbazole, preferred styrenic monomers include styrene, alkyl styrene, para-alkyl styrene, α-methyl styrene, chlorostyrene, and bromo-para-methyl styrene. Suitable examples of cationic polymers include butyl rubber, isobutylene copolymerized with para methyl styrene, polystyrene, and poly-α-methyl styrene; (iv) Miscellaneous: other suitable layers can be paper, wood, cardboard, metal, metal foils (such as aluminum foil and tin foil), metallized surfaces, glass (including silicon oxide (SiOx) coatings applied by evaporating silicon oxide onto a film surface), fabric, spunbonded fibers, and nonwovens (particularly polypropylene spun bonded fibers or nonwovens), and substrates coated with inks, dyes, pigments, and the like.

The thermoplastic polyurethane compositions of the invention or any blends thereof may also be used to prepare molded products using any molding process now known in the art or hereafter developed. Molding processes include but are not limited to, cast molding, cold forming matched-die molding, compression molding, foam molding, injection molding, gas-assisted injection molding, profile co-extrusion, profile extrusion, rotational molding, sheet extrusion, slush molding, spray techniques, thermoforming, transfer molding, vacuum forming, wet lay-up or contact molding, blow molding, extrusion blow molding, injection blow molding, and injection stretch blow molding or combinations thereof.

The thermoplastic polyurethane composition of the present invention may also be used to make an article by extrusion. That is the invention provides for an article which is made by forcing molten TPU through a die to form a shape with a fixed cross-section. Examples include but are not limited to hollow pipes, tubes and straws, solid shapes, such as bars, strands, fibers (and articles made therefrom such as fabrics, thread, yarn string and rope), square, round or other shaped bar stock, decking, planks, lumber and the like. Further examples include but are not limited to sheets and film where they can be used as glass or shield replacements as well as protective films for food and retail packaging, electronic equipment, blister packs, cartons and the like. The invention also provides from articles with long cross-sectional shapes such as gutters, siding, architectural and automotive trim, squeegee and windshield wiper blades and the like. The invention also provides for articles made by an extrusion blow molding process such as bottles and jars. A further example of articles made by an extrusion process utilizing the TPUs of this invention is insulation for electric wires and cables The invention further provides for an article where the thermoplastic polyurethane composition is included in fiber. That is the invention provides for a fiber, as well as other articles that include such a fiber, where the fiber includes (i.e. is made from) the thermoplastic polyurethane composition described herein. Fibers made from the thermoplastic polyurethane of the present invention may include monofilament fibers and/or multifilament fibers. In some embodiments, the fiber is formed by melt blowing, spunbonding, film aperturing, staple fiber carding, continuous filament spinning, or bulked continuous filament spinning.

The compositions of the invention or any blends thereof may also be used to prepare nonwoven fabrics, woven fabrics, and fibers in any nonwoven and/or woven fabric and fiber making process, including but not limited to, melt blowing, spunbonding, film aperturing, and staple fiber carding. A continuous filament process may also be used. Preferably a spunbonding process is used. The spunbonding process is well known in the art. Generally, it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

The thermoplastic polyurethane compositions of the invention any blends thereof are useful in a wide variety of applications, including transparent articles such as cook and storage ware, and in other articles such as furniture, automotive components, toys, sportswear, medical devices, sterilizable medical devices, sterilization containers, fibers, woven fabrics, nonwoven fabrics, drapes, gowns, filters, hygiene products, diapers, and films, oriented films, sheets, tubes, pipes, wire jacketing, cable jacketing, agricultural films, geomembranes, sporting equipment, cast film, blown film, profiles, boat and water craft components, and other such articles. The compositions are suitable for automotive components such as bumpers, grills, trim parts, dashboards and instrument panels, exterior door and hood components, spoiler, wind screen, windshield wipers, hub caps, mirror housing, body panel, protective side molding, and other interior and external components associated with automobiles, trucks, boats, and other vehicles.

Other useful articles and goods may be formed from the compositions of the invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, hoses, pipes, and such, including liners and/or jackets thereof. In some embodiments, the articles of the invention are fire hoses that include a liner made from the TPU compositions described herein. In some embodiments the, liner is a layer applied to the inner jacket of the fire hose.

Still additional useful articles and goods may be formed from the compositions of the invention including: a sheet, a tape, a carpet, an adhesive, a wire sheath, a cable, a protective apparel, an automotive part, a footwear component, a coating, or a foam laminate, an overmolded article, an automotive skin, an awning, gutters, architectural trim, decking, lumber, a tarp, a leather article, a roofing construction article, a steering wheel, a powder coating, a powder slush molding, a consumer durable, a grip, a handle, a hose, a hose liner, a pipe, a pipe liner, a caster wheel, a skate wheel, a computer component, a belt, an applique, a footwear component, a conveyor or timing belt, a glove (made from one or more of the films described herein, or made from one or more of the fabrics described herein), a fiber, a fabric, or a garment.

Fibers prepared using the thermoplastic polyurethane composition of this invention can be formed into a variety of products including but not limited to yarns, woven fabrics, nonwoven fabrics, hook and loop fasteners, fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelops, tamper evident fabrics, protective packaging, and coasters.

The present invention further comprises a method of increasing the moisture vapor transmission of a thermoplastic polyurethane composition, wherein the method comprises preparing a thermoplastic polyurethane composition by reacting a polyisocyanate component with a polyester polyol component which comprises the reaction product of triethylene glycol and/or tetraethylene glycol with a diacid having 6 carbon atoms or fewer, and optionally, a chain extender component. In one embodiment, the polyester polyol component comprises or consists of triethylene glycol adipate. In another embodiment, the polyester polyol component comprises or consists of tetrethylene glycol adipate. In still another embodiment, the polyester polyol component comprises or consists of triethylene glycol succinate. In another embodiment, the polyester polyol component comprises or consists of tetrethylene glycol succinate.

The present invention also comprises a method of increasing the moisture vapor transmission of a fabric while decreasing the water absorption of the fabric, comprising preparing a thermoplastic polyurethane composition by reacting a polyisocyanate component with a polyester polyol component comprising the reaction product of triethylene glycol and/or tetraethylene glycol with a diacid having 6 carbon atoms or fewer, and optionally, a chain extender component, spinning the thermoplastic polyurethane composition to form a fiber; and using the fiber to make a fabric. In one embodiment, the polyester polyol component comprises or consists of triethylene glycol adipate. In another embodiment, the polyester polyol component comprises or consists of tetrethylene glycol adipate. In still another embodiment, the polyester polyol component comprises or consists of triethylene glycol succinate. In another embodiment, the polyester polyol component comprises or consists of tetrethylene glycol succinate.

In one useful embodiment, the articles of the present invention are made from a thermoplastic polyurethane composition as described herein wherein the thermoplastic polyurethane composition has a Shore A hardness of 70A to 95A measured according to ASTM D2240. In one embodiment, the articles are made from a thermoplastic polyurethane composition of the present invention which has a MVT of at least 1700 g/m$^2$ 24 hr measured by a Mocon Permatran-W per ASTM D6701, for example at least 2000 g/m$^2$*24 hr, or even at least 2400 g/m$^2$*24 hr. In one embodiment, an article is made from the thermoplastic polyurethane composition as described herein wherein the TPU has a water absorption measured by ASTM D471 of 30% or less and a hardness of 85 Shore A or less as measured by ASTM D2240. In another embodiment, an article is made from the thermoplastic polyurethane composition as described herein wherein the TPU has a water absorption measured by ASTM D471 of 15% or less and a hardness of 85 Shore A or greater.

The invention is further illustrated by the Examples below. A series of TPU compositions of varying hardness were formed by reacting the polyol noted in Table 1, with MDI, and 1,4-butane diol as chain extender. MVT was measured as described above on 1.5-3 mil thick compression molded films, water absorption was measured as described above on 30 mil thick compression molded films, and hardness measured as described above on 250 mil thick compression molded blocks.

TABLE 1

| Ex. | Polyol | MVT (mil*g/m$^2$*24 hr) | Water Absorption (%) | Shore Hardness |
|---|---|---|---|---|
| C1 | Polyethylene glycol | 4750 | 35 | 90A |
| C2 | Diethylene glycol adipate | 1640 | 2.1 | 87A |
| C3 | Polyethylene glycol | 7500 | 58 | 80A |
| C4 | Diethylene glycol adipate | 2300 | 2.3 | 77A |
| 1 | Triethylene glycol adipate | 2480 | 3.3 | 86A |
| 2 | Tetraethylene glycol adipate | 3390 | 5.0 | 85A |
| 3 | Triethylene glycol succinate | 2970 | 5.6 | 84A |
| 4 | Triethylene glycol succinate | 2520 | 5.0 | 90A |
| 5 | Triethylene glycol succinate | 1720 | 3.9 | 92A |
| 6 | Tetraethylene glycol succinate | 3680 | 9.4 | 87A |
| 7 | Tetraethylene glycol succinate | 2650 | 8.0 | 93A |
| 8 | Triethylene glycol adipate | 3470 | 3.7 | 74A |
| 9 | Tetraethylene glycol adipate | 4740 | 6.4 | 73A |
| 10 | Triethylene glycol (95 mol %)-Tegomer 3403 (5 mol %) adipate | 4780 | 21 | 73A |
| 11 | Triethylene glycol (95 mol %)-Tegomer 3403 (5 mol %) adipate | 2855 | 9.4 | 81A |
| 12 | Tetraethylene glycol (95 mol %)-Tegomer 3403 (5 mol %) adipate | 3050 | 13 | 81A |
| 13 | Tetraethylene glycol (95 mol %)-Tegomer 3403 (5 mol %) adipate | 3890 | 26 | 68A |
| 14 | Triethylene glycol succinate | 3500 | 6.2 | 81A |
| 15 | Tetraethylene glycol succinate | 4940 | 14.2 | 75A |
| 16 | Tetraethylene glycol succinate | 4280 | 12.6 | 82A |

Comparative Examples C1-C4 in Table 1 illustrate the expected result that higher MVT materials have higher water absorption. In general, it is also expected that harder TPUs will have lower MVTs. The inventive examples 1-16 in Table 1 illustrate that the present invention unexpectedly provide higher MVT and lower water absorption when compared to other TPU of similar hardness.

As used herein, the transitional term "comprising", which is synonymous with "including", "containing", or "characterized by", is inclusive or open-ended and does not exclude additional, un recited elements or method steps. However, in each recitation of "comprising" herein, it is intended that the term also encompass, as alternative embodiments, the phrases "consisting essentially of" and "consisting of", where "consisting of" excludes any element or step not specified and "consisting essentially of" permits the inclusion of additional un recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

The invention claimed is:

1. A method of increasing the moisture vapor transmission of a fabric while decreasing the water absorption of the fabric, comprising:
    preparing a thermoplastic polyurethane comprising (a) a polyisocyanate component and (b) a polyol component, wherein the polyol component comprises a polyester comprising the reaction product of triethylene glycol, ethoxylated polyether 1,3-diol and a diacid having 6 carbon atoms or fewer;
    spinning the thermoplastic polyurethane composition to form a fiber;
    using the fiber to make a fabric.

2. The method of claim 1, wherein the polyol component comprises at least 90% by weight of the polyester.

3. The method of claim 1, wherein the diacid having 6 carbon atoms or fewer comprises adipic acid, succinic acid, or mixtures thereof.

4. The method of claim 1, wherein the diacid comprises adipic acid.

5. The method of claim 1, wherein the diacid comprises succinic acid.

6. The method of claim 1, wherein the thermoplastic polyurethane has a Shore A hardness of 70A to 95A.

7. The method of claim 1, wherein the thermoplastic polyurethane has a moisture vapor transmission of at least 1700 g/m$^2$*24 hr measured by a Mocon Permatran-W per ASTM D6701.

8. The method of claim 1, wherein the thermoplastic polyurethane has a water absorption measured by ASTM D471 of 30% or less and a hardness of 85 Shore A or less measured by ASTM D2240.

9. The method of claim 1, wherein the thermoplastic polyurethane composition has a water absorption measured by ASTM D471 of 15% or less and a hardness of 85 Shore A or greater measured by ASTM D2240.

10. A method of increasing the moisture vapor transmission of a fabric while decreasing the water absorption of the fabric, comprising:
    preparing a thermoplastic polyurethane comprising (a) a polyisocyanate component and (b) a polyol component, wherein the polyol component comprises a polyester comprising the reaction product of tetraethylene glycol, ethoxylated polyether 1,3-diol, and a diacid having 6 carbon atoms or fewer;
    spinning the thermoplastic polyurethane composition to form a fiber;
    using the fiber to make a fabric.

11. The method of claim 10, wherein the polyol component comprises at least 90% by weight of the polyester.

12. The method of claim 10, wherein the diacid having 6 carbon atoms or fewer comprises adipic acid, succinic acid, or mixtures thereof.

13. The method of claim 10, wherein the diacid comprises adipic acid.

14. The method of claim 10, wherein the diacid comprises succinic acid.

15. The method of claim 10, wherein the thermoplastic polyurethane has a Shore A hardness of 70A to 95A.

16. The method of claim 10, wherein the thermoplastic polyurethane has a moisture vapor transmission of at least 1700 g/m$^2$*24 hr measured by a Mocon Permatran-W per ASTM D6701.

17. The method of claim 10, wherein the thermoplastic polyurethane has a water absorption measured by ASTM D471 of 30% or less and a hardness of 85 Shore A or less measured by ASTM D2240.

18. The method of claim 10, wherein the thermoplastic polyurethane composition has a water absorption measured by ASTM D471 of 15% or less and a hardness of 85 Shore A or greater measured by ASTM D2240.

* * * * *